United States Patent

[11] 3,623,510

| [72] | Inventors | Terence G. Hare<br>Union Lake;<br>Hugh McCormick, Dearborn, both of Mich. |
|---|---|---|
| [21] | Appl. No. | 844,869 |
| [22] | Filed | July 25, 1969 |
| [45] | Patented | Nov. 30, 1971 |
| [73] | Assignee | Miller Manufacturing Company<br>South Field, Mich. |

[54] SINGLE HANDLE FAUCET VALVE
18 Claims, 9 Drawing Figs.

[52] U.S. Cl. .................................................. 137/636.3,
     137/607, 137/614.17, 137/614.11
[51] Int. Cl. ....................................................... F16k 11/06
[50] Field of Search ............................................ 137/636.1,
     636.3, 636

[56] References Cited
UNITED STATES PATENTS

| 2,923,315 | 2/1960 | Bletcher | 137/636.1 X |
| 2,978,917 | 4/1961 | Moen | 137/636 X |
| 3,130,750 | 4/1964 | Post | 137/636.3 |
| 3,384,121 | 5/1968 | Spencer | 137/636.1 X |
| 3,506,036 | 4/1970 | Hare | 137/636.3 |

FOREIGN PATENTS

| 647,824 | 9/1962 | Canada | 137/636.1 |

Primary Examiner—Clarence R. Gordon
Attorney—Barnes, Kisselle, Raisch & Choate

ABSTRACT: The single handle faucet disclosed herein comprises a faucet body which has a pair of inlets for hot and cold water and a liquid outlet. A valve body is mounted for swinging movement in a single plane within the body and has a spherical surface that is complementary to a similar compressible spherical surface on the faucet body. The valve body has a valve seat therein and passages extend from the spherical surface of the valve body to the valve seat. A valve stem is mounted within the valve body and supports a bib which is movable toward and away from the valve seat. Seals are provided on the valve.

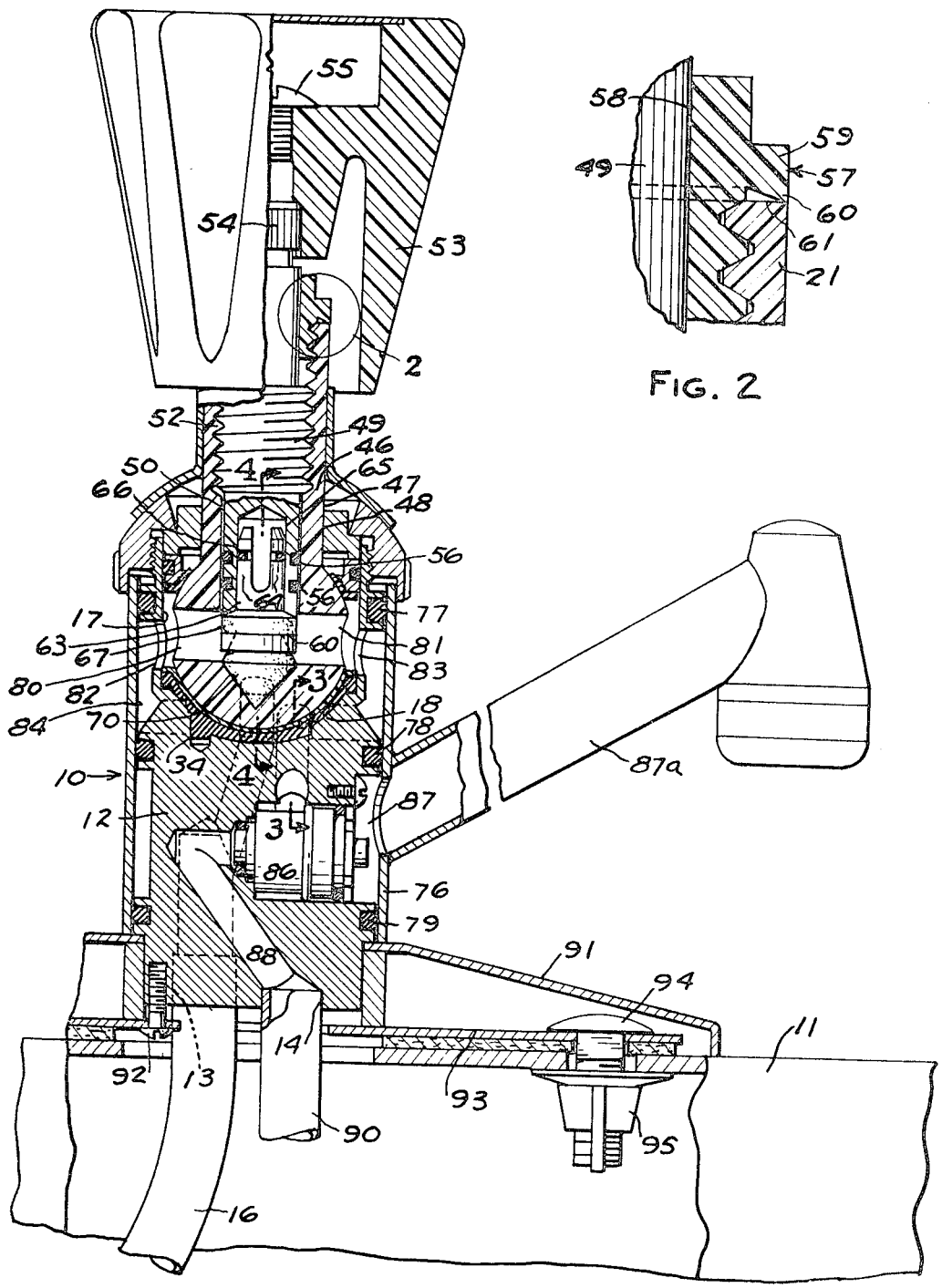

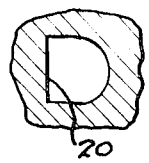
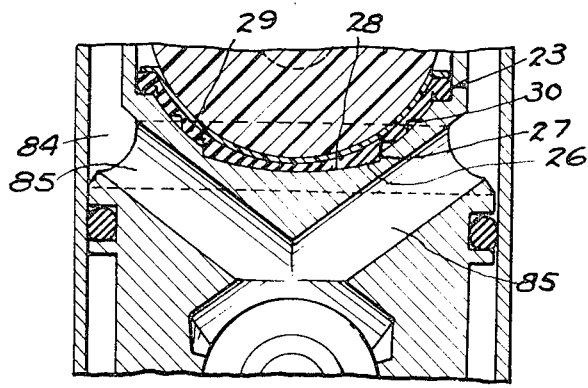
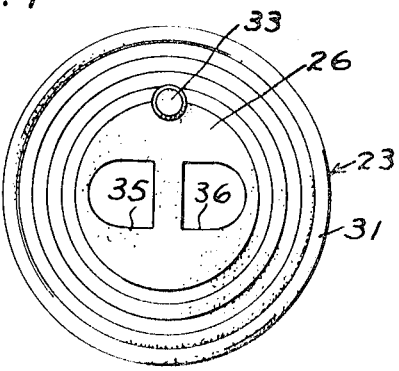
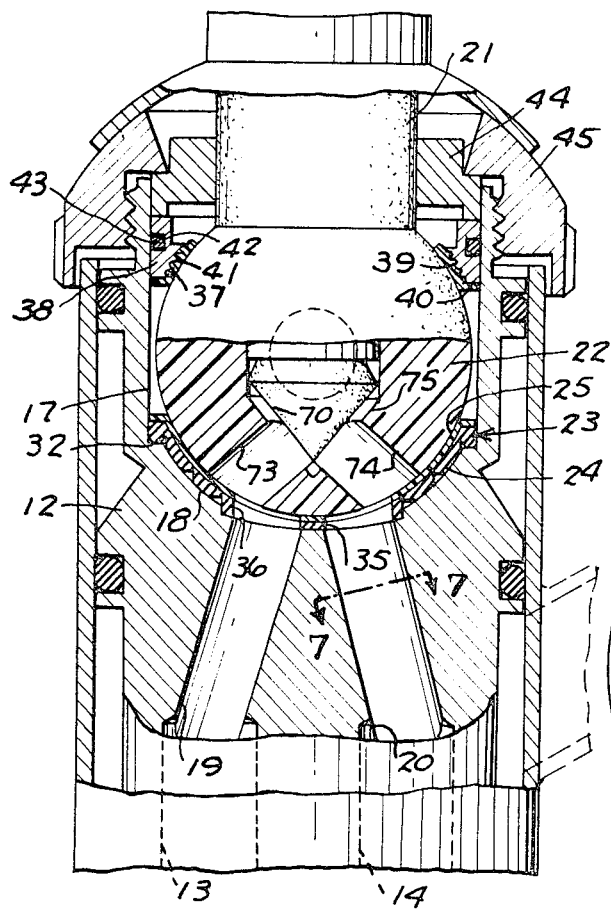
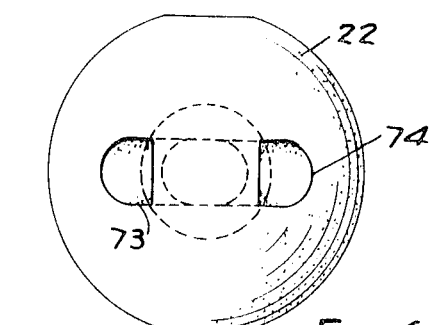
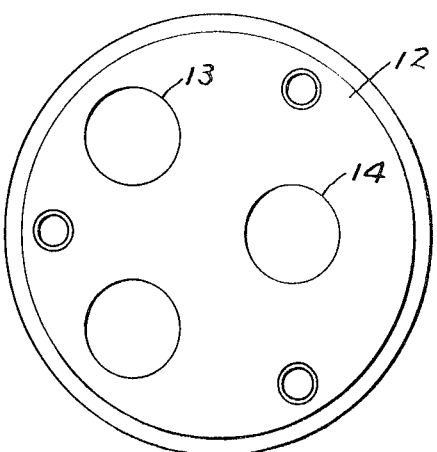

3,623,510

SINGLE HANDLE FAUCET VALVE

This invention relates to water faucets and particularly to single handle faucets.

BACKGROUND OF THE INVENTION

In the faucet art it is common to have what is known as a single handle faucet wherein manipulation of a single handle controls both the degree of mixture of hot and cold water as well as the volume of water which is emitted.

In the copending application of Terence G. Hare, Ser. No. 652,051, filed July 10, 1967, now issued as U.S. Pat. No. 3,506,036, dated Apr. 14, 1970, there is disclosed and claimed a single handle faucet which comprises a faucet body which has a pair of inlets for hot and cold water and a liquid outlet. A valve body is mounted for swinging movement in a single plane within the faucet body and has a spherical surface that is complementary to a similar compressible spherical surface on the faucet body. The valve body has a valve seat therein and passages extend from the spherical surface of the valve body to the valve seat. A vale stem is mounted within the valve body and supports a bib which is movable toward and away from the valve seat. In one form, seals are provided on the valve and comprise spaced annular sealing members between the valve body and faucet body. In another form, the seals comprise a first annular sealing member and a spherical sealing member interposed between the spherical surface of the valve and the valve body.

Among the objects of this invention are to provide an improved single handle faucet of the type shown in the aforementioned Hare application; wherein improved sealing is provided between the valve body and faucet body; wherein leakage between the hot and cold inlets is eliminated and entirely avoided; wherein specific provision is made for supplying sufficient water to a diverter for, in turn, supplying s spray attachment.

SUMMARY

The single handle faucet disclosed herein comprises a faucet body which has a pair of inlets for hot and cold water and a liquid outlet. A valve body is mounted for swinging movement in a single plane within the faucet body and has a spherical surface that is complementary to a similar compressible spherical surface on the faucet body. The valve body has a valve seat therein and passages extend from the spherical surface of the valve body to the valve seat. A valve stem is mounted within the valve body and supports a bib which is movable toward and away from the valve seat. Seals are provided on the valve.

In accordance with the invention, a spherical compressible sealing surface is provided by a resilient body having a spherical relatively incompressible layer of a low friction material thereon which is dimensionally stable and resistant to hot water. The resilient body has a thickened portion in the area of the inlets of the faucet body which thickened portion extends into a recess of the faucet body. The openings and inlets preferably have a D-shaped configuration. The faucet body further includes novel passages permitting free flow of water therethrough.

DESCRIPTION OF THE DRAWINGS

FIG. 1 is a fragmentary part sectional view of a faucet embodying the invention.

FIG. 1a is a fragmentary sectional view through a portion of the valve stem shown in FIG. 1.

FIG. 2 is a fragmentary sectional view of the encircled portion 2 in FIG. 1.

FIG. 3 is a fragmentary sectional view taken along the line 3—3 in FIG. 1.

FIG. 4 is a fragmentary sectional view taken along the line 4—4 in FIG. 2.

FIG. 5 is a bottom plan view of one of the sealing members.

FIG. 6 is a bottom view of the valve body.

FIG. 7 is a fragmentary sectional view taken along the line 7—7 in FIG. 4.

FIG. 8 is a bottom view of the faucet body.

DESCRIPTION

Referring to FIG. 1, the faucet 10 is adapted to be mounted on a sink 11 or the like, as presently described. As shown in FIGS. 1, 3 and 4, the faucet 10 comprises a faucet body 12 which has spaced vertical inlets 13, 14 in the lower end thereof into which pipes 15, 16 extend. Body 12 is formed with a cylindrical cavity 17 that has an open upper end. The lower wall of the cavity is formed with a generally spherical surface 18. Passages 13, 14 communicate through passageways 19, 20 with the surface 18. A valve body 21 which has a spherical lower end 22 extends into the cavity 17 with the spherical surface thereof engaging a spherical seating surface on a sealing member 23.

As shown in FIGS. 1, 3, 4 and 5, sealing member 23 comprises a body of rubber or other similar resilient material 24 and a layer 25 of relatively incompressible dimensionally stable low friction material bonded to the upper surface thereof. A satisfactory material comprises Teflon. As shown in FIG. 3, the sealing member 23, and particularly the rubber body 24 thereof, includes a central thickened portion 26 which is generally circular and extends into a complementary recess 27, the bottom surface 28 of the recess being generally concave. The portion of the rubber body 24 surrounding the thickened portion 26 is formed with annular serrations 29 in order that the body may have better resilient sealing contact with the spherical portion 30 of the surface 18. The sealing member 23 also includes a peripheral lip 31 that engages a complementary shoulder 32 on the faucet body 12. Finally, the rubber body 24 of the sealing member 23 includes a small axial projection 33 that extends into a complementary opening 34 to circumferentially locate the sealing member and thereby align openings 35, 36 therein with the upper ends of the passageways 19, 20.

An annular seal 37 which has a generally obtuse angle cross section in the untensioned state is provided adjacent the upper end of the spherical portion 22 and is urged into sealing contact therewith by a collar 38 that extends into the cylindrical cavity 17 and has surfaces 39, 40 that extend upwardly and inwardly and horizontally, respectively, to engage the legs of the seal 37 and urge the inclined leg against the surface of the spherical member 22. The surface of collar 38 which engages the seal 37 has annular ribs 41 thereon which firmly grip the seal 37 and urge it against the spherical surface of the valve body 22. The collar 38 is formed with an annular groove 42 in which an O-ring 43 is seated to provide a seal between the seal collar 37 and the wall of the cavity 17.

A guide ring 44 extends within the cavity 17 over the seal collar 38 (FIG. 3). A faucet nut 45 is threaded on the upper end of the valve body 12 and holds the guide ring 44 and, in turn, the collar 38 in position to, in turn, cause the seal 37 to engage the surface of the spherical portion 22 of the valve body 22 and urge it toward surface 25.

The valve 21 includes a generally cylindrical portion 46 with two flat sides 47 that extends upwardly through an elongated opening 48 in the guide ring 44. The width of the flat portion 46 is substantially equal to the width of the opening 40 so that the valve 21 is limited in its movement by guide ring 44 so that it will move only in a single plane, as presently described.

The seal 37 is preferably made of a low friction material which is resistant to hot water and is dimensionally stable. A satisfactory material comprises Teflon. The valve 21 is also preferably made of a low friction dimensionally stable material that is resistant to hot water and is different from material of seals 37, 23. A satisfactory material comprises polyphenyline oxide such as made by General Electric Company, Pittsfield, Mass., and sold under the trademark PPO, grade C-1001.

A valve stem 49 extends downwardly within an opening 50 in the valve body 21 and has an intermediate threaded portion 51 which engages threads 52 in the side of the opening 50. A handle or knob 53 has serrations thereon engaging complementary serrations 54 on the upper end of the stem 49. A screw 55 is threaded through an opening in the upper end of the knob 53 into the upper end of the stem 49. By rotating the knob 53, the stem 49 is translated radially inwardly and outwardly with respect to the valve body 21 within the opening 50. The stem is provided with longitudinally spaced O-rings 56 that extend in grooves in the stem and engage the sides of the opening 50. A locking member 57, made of similar material as valve body 21, is threaded into the upper end of the valve body 21 and has an opening 58 through which the upper end of the stem 49 extends. Locking member 57 includes a peripheral flange 59 having an outwardly and downwardly extending lower portion 60 terminating in a circular edge which engages the upper flat end of the valve body 21. Locking member 57 and valve body 21 are made of similar material so that by tightening the locking member 57 downwardly against the valve body 21, the portion 60 is brought into intimate contact with the flat upper surface 61 producing a tight seal that will not readily loosen.

A bib 62 is provided on the lower end of the stem 49. Bib 62 is made of low friction material such as the material of the valve body 21 which comprises a single cylindrical portion 63 of substantially the same diameter as opening 50 and an upper bifurcated portion 64. Each bifurcated portion 64 is provided with a groove 65a on its outer periphery spaced from the upper end and a split metal ring 66 is sprung over the bifurcated ends 64. The ring 66 has an outer diameter greater than the diameter of the opening 50 so that it frictionally and nonrotatably engages the opening. This holds the bib 62 within the opening 50 and prevents axial movement thereof. However, the bib 62 is free to rotate relative to the ring 66 in order to minimize wear. The upper ends of the bifurcated portion 64 when in the untensioned state define a diameter that is larger than the diameter of opening 50.

The lower end of the bib 62 is formed with a flange 67 that engages the lower end of the valve stem. The lower end 67 has its bottom formed with an annular groove 68 and an axially extending conical projection 69. A sealing member 70 of rubber is frictionally held on the projection 69 of the bib. The projection 69 is formed with a shoulder that frictionally engages the opening in the sealing member 70. An uninterrupted ring 71 having a tapered inner surface is provided adjacent the upper surface of the sealing member 70 to retain the sealing member on the projection 69. The sealing member 70 and ring 71 are first brought together and then applied to the projection 69 as a unit by forcing upwardly on the projection.

The spherical portion 22 of valve body 21 includes generally radially extending openings 73, 74 which extend from the spherical surface 25 to a conical seat 75 against which the sealing member 70 is engaged.

Referring to FIGS. 1, 3 and 4, a cylindrical sheet metal sleeve 76 is rotatably mounted and surrounds the body 12 with O-rings 77, 78 and 79 in annular recesses in the body engaging the interior of the sleeve to provide a seal. The spherical portion 22 includes radial passages 80, 81 which permit flow of water outwardly through openings 82, 83 into the space 84 between the valve body 12 and the sleeve 76. As viewed in FIG. 3, further passages 85 extend from the annular space 84 to one end of a diverter 86 through which the water passes to space 87 and, in turn, to spigot 87a. The diverter 86 has one end thereof communicating with a passage 88 extending to conduit 90, the latter communicating with a spray nozzle of conventional construction such that actuation of the nozzle diverts the water from the spigot 87 to the nozzle. The construction of the diverter is well known and forms no part of the present invention. The provision of passages 85, 86 insures a substantial flow to the spigot as well as to the diverter from the space 84.

As shown in FIGS. 5, 6 and 7, the passageways 19, 20, openings 35, 36 and passages 73, 74 are generally D-shaped in cross section with their straight sides adjacent one another. This shape and arrangement tends to insure a full and complete flow through the various passages and openings. The provision of the thickened portion 26 on the sealing member 23 insures a proper seal and eliminates cross-over between the inlet passages 19, 20.

By swinging the knob and, in turn, the valve body 21, the degree of registry of openings 73, 74 with respect to passages 19, 20 may be controlled; the extent of registry determining the relative amounts of hot and cold water which are delivered to the passages 73, 74. By threading the stem downwardly, the conical surface of the sealing member is brought into registry with the complementary surface 75 to close and prevent flow out of the openings 73, 74.

Referring to FIG. 1, the faucet is mounted on the sink 11 by an escutcheon 91 that is fixed to the lower end of the valve body 12 by screws and has a bottom plate 93 through which a bolt 94 and nut 95 can extend for engagement with the sink.

We claim:

1. In a single handle faucet, the combination comprising
   a faucet body,
   said faucet body having a pair of liquid inlets for hot and cold water and a liquid outlet,
   said faucet body having a generally spherical surface,
   a sealing member mounted on said surface and having a centrally located axially thickened portion,
   said faucet body having a complementary recess into which said thickened portion of said sealing member extends,
   said faucet body having passages extending from said inlets to said recess in said faucet body,
   said sealing member having openings through said thickened portion aligned with the passages in said faucet body,
   a valve body mounted for swinging movement in a single plane within said faucet body,
   said valve body having a spherical surface complementary to said spherical surface on said sealing member,
   said valve body having a valve seat therein and passage means extending from said spherical surface of said valve body to said valve seat,
   said passage means terminating along said spherical surface such that said passage means is adjacent said thickened portion of said sealing member in all portions of said valve body,
   a valve stem mounted within said valve body for movement toward and away from said valve seat,
   a bib seal on said valve stem adapted to engage said valve seat,
   said valve stem having a portion thereof extending exteriorly of said body for manual manipulation of said stem,
   and means for guiding said valve body to selectively change the communication of the passages in the valve body with the inlets of said faucet body,
   a seal comprising an annular flexible ring of dimensionally stable low friction plastic material and means interposed between said ring and said faucet body for yieldingly urging said ring against said spherical surface of said valve body.

2. The combination set forth in claim 1 including a layer of relatively incompressible dimensionally stable low friction plastic material on said sealing member.

3. The combination set forth in claim 1 wherein said sealing member has openings therein that are generally D-shaped in cross section with the straight sides thereof adjacent one another.

4. The combination set forth in claim 1 wherein said inlets in said faucet body are generally D-shaped in cross section.

5. The combination set forth in claim 1 including annular ribs on the underside of said sealing member surrounding said axially thickened portion.

6. The combination set forth in claim 1 including a peripheral flange on said sealing member, said valve body having a complementary engaging surface.

7. The combination set forth in claim 1 including a pair of passages extending from the area between said sealing member and said seal surrounding said spherical surface of said valve body,
    said passages extending to a horizontal passage communicating with the exterior of said valve body.

8. The combination set forth in claim 1 including a locking member on the upper end of said valve body,
    one of said locking member and said valve body having a generally flat radial surface,
    the other of said locking member and said valve body having an annular thin contact surface engaging said flat surface.

9. The combination set forth in claim 1 wherein said body has spaced annular grooves in the periphery thereof,
    a cylindrical member surrounding said valve body and O-rings positioned in said groove and engaging the interior of said cylindrical member.

10. In a single handle faucet, the combination comprising
    a faucet body,
    said faucet body having a pair of liquid inlets for hot and cold water and a liquid outlet,
    said faucet body having a generally spherical surface,
    a sealing member mounted on said surface and having a centrally located generally circular axially thickened portion,
    said faucet body having a complementary recess into which said thickened portion of said sealing member extends,
    said faucet body having passages extending from said inlets to said recess in said faucet body,
    said sealing member having openings through said thickened portion aligned with the passages in said faucet body,
    a layer of relatively incompressible dimensionally stable low friction plastic material on said sealing member,
    said sealing member having an axial projection thereon,
    said faucet body having an opening into which said projection extends,
    a valve body mounted for swinging movement in a single plane within said faucet body,
    said valve body having a spherical surface complementary to said spherical surface on said sealing member,
    said valve body having a valve seat therein and passage means extending from said spherical surface of said valve body to said valve seat,
    said passage means terminating along said spherical surface such that said passage means is adjacent said thickened portion of said sealing member in all portions of said valve body,
    a valve stem mounted within said valve body for movement toward and away from said valve seat,
    a bib seal on said valve stem adapted to engage said valve seat,
    said valve stem having a portion thereof extending exteriorly of said body for manual manipulation of said stem,
    and means for guiding said valve body to selectively change the communication of the passages in the valve body with the inlets of said faucet body,
    a seal comprising an annular flexible ring of dimensionally stable low friction plastic material and means interposed between said ring and said faucet body for yieldingly urging said ring against said spherical surface of said valve body.

11. The combination set forth in claim 10 wherein said sealing member has openings therein that are generally D-shaped in cross section with the straight side thereof adjacent one another.

12. The combination set forth in claim 10 including annular ribs on the underside of said sealing member surrounding said axially thickened portion.

13. The combination set forth in claim 10 including a peripheral flange on said sealing member,
    said valve body having a complementary engaging surface.

14. In a single handle faucet, the combination comprising
    a faucet body,
    said faucet body having a pair of liquid inlets for hot and cold water and a liquid outlet,
    said faucet body having a generally spherical surface,
    a sealing member mounted on said surface and having a centrally located axially thickened portion,
    said faucet body having a complementary recess into which said thickened portion of said sealing member extends,
    said faucet body having passages extending from said inlets to said recess in said faucet body,
    said sealing member having openings through said thickened portion aligned with the passages in said faucet body,
    a valve body having a spherical surface complementary to said spherical surface on said sealing member,
    said valve body having a valve seat therein and passage means extending from said spherical surface of said valve body to said valve seat,
    said passage means terminating along said spherical surface such that said passage means is adjacent said thickened portion of said sealing member in all positions of said valve body,
    and means for guiding said valve body to selectively change the communication of the passages in the valve body with the inlets of said faucet body,
    a seal comprising an annular flexible ring of dimensionally stable low friction plastic material and means interposed between said ring and said faucet body for yieldingly urging said ring against said spherical surface of said valve body.

15. The combination set forth in claim 14 including a layer of relatively incompressible dimensionally stable low friction plastic material on said sealing member.

16. The combination set forth in claim 14 wherein said sealing member has openings therein that are generally D-shaped in cross section with the straight sides thereof adjacent one another.

17. The combination set forth in claim 14 wherein said inlets in said faucet body are generally D-shaped in cross section.

18. The combination set forth in claim 14 including annular ribs on the underside of said sealing member surrounding said axially thickened portion.

* * * * *